(No Model.)
S. BURDSALL & C. THOMPSON.
RUNNING GEAR.
No. 376,795. Patented Jan. 24, 1888.
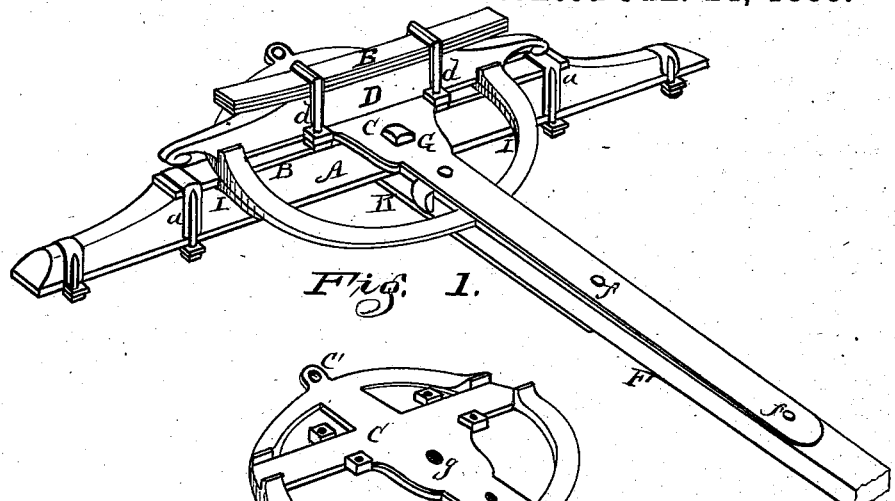
Fig. 1.
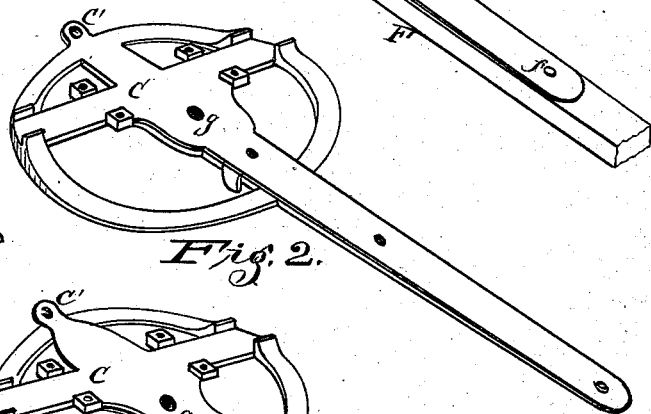
Fig. 2.
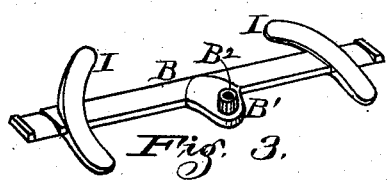
Fig. 3.
Fig. 7.
Fig. 4.
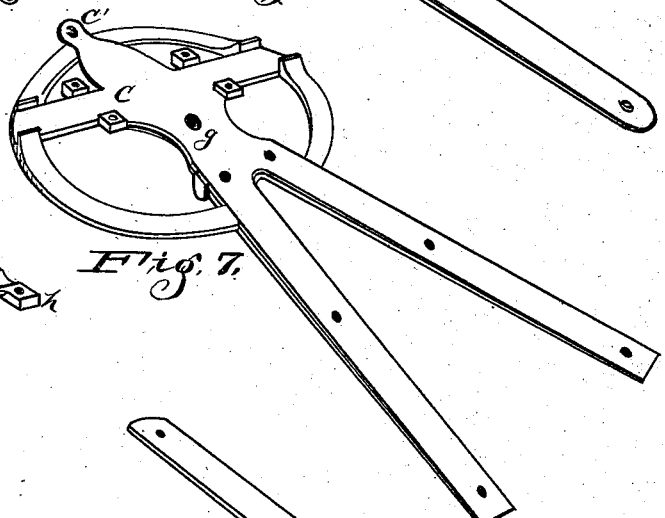
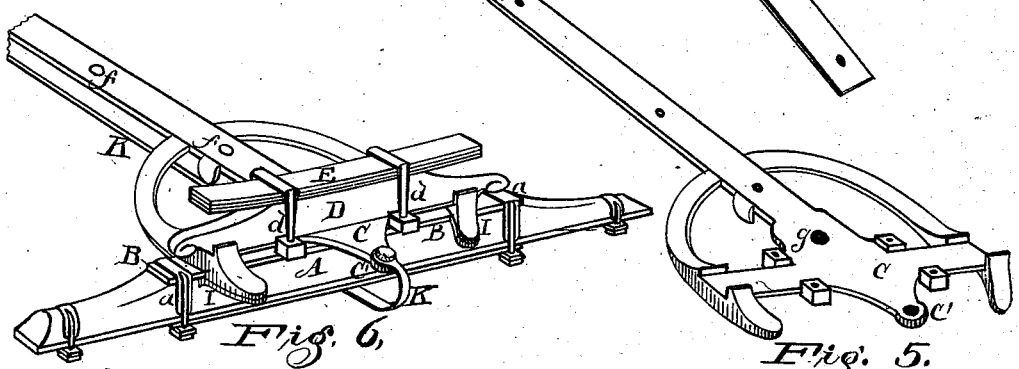
Fig. 6. Fig. 5.
Witnesses, Inventors,
A. W. Getchell Stephen Burdsall,
Oda W. Warren Charles Thompson
 by Geo. W. Tibbitts Atty.
N. PETERS. Photo-Lithographer. Washington, D. C.

UNITED STATES PATENT OFFICE.

STEPHEN BURDSALL AND CHARLES THOMPSON, OF FREMONT, OHIO, ASSIGNORS TO THE HERBRAND CO., OF SAME PLACE.

RUNNING-GEAR.

SPECIFICATION forming part of Letters Patent No. 376,795, dated January 24, 1888.

Application filed January 31, 1887. Serial No. 226,101. (No model.)

*To all whom it may concern:*

Be it known that we, STEPHEN BURDSALL and CHARLES THOMPSON, both of Fremont, in the county of Sandusky and State of Ohio, have invented certain new and useful Improvements in Running-Gear for Vehicles, of which the following is a specification.

This invention relates to improvements in running-gear for vehicles, and has for its object to adapt the several inventions covered by Letters Patent Nos. 244,599, 276,967, 277,725, and 343,296 to vehicles other than carriages and buggies—that is, to vehicles in which the front wheels are required to turn around in under the body for the purpose of turning such vehicles around in a small space.

To this end the invention consists in making the rub-irons of the upper fifth-wheel plate in a complete or nearly complete circle, thereby providing a bearing for turning the forward axle around under the body of the wagon.

In the drawings, Figure 1 is a perspective view of our improved running-gear as seen connected with the forward axle. Fig. 2 is a detached view of the upper fifth-wheel plate, and Fig. 3 is a detached view of the lower plate. Fig. 4 is a detached view of a plate designed for securing our improvements to vehicles having tubular or round axles. Fig. 5 represent an upper fifth-wheel plate having open front or a partial circle. Fig. 6 is a front view, in perspective, showing our improved running-gear as seen connected with a front axle. Fig. 7 is a detached view of an upper fifth-wheel iron adapted to a double reach.

A is the axle, and B is the lower fifth-wheel plate, which is secured to the axle by the clips *a a*.

C is the upper fifth-wheel plate, which is secured to the head-block D by the bolts *d d*, which also secure the spring E to the same, and F is the reach, to which the rear extension of the said plate C is secured by bolts *f f*.

The plate B has a rearwardly-projecting arm, B', and a hub, B², the latter extending into the lower and enlarged portion of the bore *g*, the king-bolt G passing through a bore in the said hub, all of which construction is described in the beforementioned Letters Patent.

In the aforesaid patents the upper plate has segmental lugs or rub-irons like those on lower plate. (Seen at I I, Fig. 3.)

The present improvement consists in making the said rub-irons in a continuous circle to the rear of the center of motion, and either continuous or open in front of the plate, as seen in Fig. 5, the object being to provide for a continuous bearing-surface, to enable the axle to be turned around in under the front end of a wagon-body, whereby such wagons are enabled to make much shorter turns, the constructions in said patent being designed only for carriages which have larger fore wheels, and do not require that the axle should turn but a short distance.

The present improvement, also, is designed to be adapted to vehicles having tubular axles, for which purpose we provide a semi-tubular plate, H, having lugs *h h*, by means of which the clips *a a* may be used for securing said plate in conjunction with the plate B. Said plate H also has a rearward projection, H', similar to B' on plate B, through which the king-bolt in like manner passes.

K is a strap secured to the under side of the reach, which passes forward under the axle, receiving the lower end of the king-bolt, and terminates with a bolt by which it is secured to the forward lug, C', on plate C.

In case the circle of the rub-iron is made open in front, as seen in Figs. 5 and 6, the strap K has its forward end curved upward and over to form a bow, so that in turning the axle the rub-irons on the lower plate will not strike against it and interfere with the turning of the axle.

Having described our improvements, we claim—

1. In running-gear for vehicles, the combination, with the axle, reach, bolster, or head-block and king-bolt, located in rear of the axle, of the fifth-wheel plates B C, plate B having rearwardly-projecting arm through which the king-bolt passes, also having the segmental rub-irons extending in front and rear, the plate C having the continuous circle rub iron and perforated lugs for the clips *d d*, and the cross-bar extending rearward of the circle rub-iron, and having holes for securing it to the reach, and also the hole *g* for the king-bolt, all constructed and operating substantially as described.

2. In running-gear for vehicles, the combination, with the axle, reach, bolster, or head-block and king-bolt, located in rear of the axle, of the fifth-wheel plates B C, plate B having rearwardly-projecting arm through which the king-bolt passes, also having the segmental rub-irons extending in front and rear, the plate C having the partial circle rub-iron and the perforated lugs for the clips $d$ $d$, and the cross-bar provided with the hole $g$ for the king-bolt, and having two branches extending rearwardly and pierced with holes for securing them to the reaches, a bottom plate, H, having perforated lugs $h$ $h$ at each end, and a central rearwardly-projecting arm through which the king-bolt passes, all constructed to operate substantially as described.

STEPHEN BURDSALL.
CHAS. THOMPSON.

Witnesses:
H. L. BUCKLAND,
F. D. THOMPSON.